United States Patent
Mays (10) Patent No.: US 9,026,343 B2
(45) Date of Patent: May 5, 2015

(54) SYSTEMS AND METHODS FOR IMPROVING THE EFFICIENCY OF A VEHICLE

(75) Inventor: Wesley Mays, Coppell, TX (US)

(73) Assignee: PACCAR Inc, Bellevue, WA (US)

( * ) Notice: Subject to any disclaimer, the term of this patent is extended or adjusted under 35 U.S.C. 154(b) by 633 days.

(21) Appl. No.: 12/981,309

(22) Filed: Dec. 29, 2010

(65) Prior Publication Data

US 2012/0173075 A1 Jul. 5, 2012

(51) Int. Cl.
*G01C 21/36* (2006.01)
*B60W 10/06* (2006.01)
*B60W 10/10* (2012.01)
(Continued)

(52) U.S. Cl.
CPC ........... *G01C 21/3697* (2013.01); *B60W 10/06* (2013.01); *B60W 10/10* (2013.01); *B60W 10/184* (2013.01); *B60W 30/143* (2013.01); *B60W 50/0097* (2013.01); *B60W 50/14* (2013.01); *B60W 2530/10* (2013.01); *B60W 2550/142* (2013.01); *B60W 2550/143* (2013.01); *B60W 2550/22* (2013.01); *B60W 2550/402* (2013.01); *G01C 21/3453* (2013.01); *G01C 21/3469* (2013.01); *G01C 21/3492* (2013.01); *Y02T 10/84* (2013.01); *B60K 6/445* (2013.01); *Y02T 10/6239* (2013.01); *Y02T 10/6269* (2013.01)

(58) Field of Classification Search
CPC ...................... B60W 50/0098; B60W 50/0097; B60W 50/14; B60W 10/06; B60W 10/10; B60W 10/184; B60W 30/143; B60W 2530/10; B60W 2530/142; B60W 2530/143; B60W 2530/22; B60W 2530/402; B60K 6/445; G01C 21/3469; G01C 21/00; G01C 21/26; G01C 21/34; G01C 21/3453; G01C 21/3492; G01C 21/3461; G01C 21/3484; G01C 21/36; G01C 21/3626; G01C 21/3697; G01C 21/3641; G07C 5/008; G07C 5/02; G07C 5/004
USPC ............ 701/110, 31.4, 32.1, 33.7, 34.3, 32.8, 701/414, 51, 65, 534
See application file for complete search history.

(56) References Cited

U.S. PATENT DOCUMENTS 5,487,002 A * 1/1996 Diller et al. ....................... 701/1
5,832,400 A 11/1998 Takahashi
(Continued)

FOREIGN PATENT DOCUMENTS

| EP | 1860354 A1 | 11/2007 |
|---|---|---|
| WO | 2009113967 A1 | 9/2009 |
| WO | 2010134824 A1 | 11/2010 |

OTHER PUBLICATIONS

European Search Report mailed Aug. 10, 2012, issued in related European Application No. 11195990.4, filed Dec. 29, 2011, 9 pages.

*Primary Examiner* — Adam Tissot
(74) *Attorney, Agent, or Firm* — Christensen O'Connor Johnson Kindness PLLC (57) ABSTRACT

Operational efficiency and/or control systems and methods for vehicles are provided in order to improve fuel efficiency when traveling in a fuel powered vehicle from point A to point B. The systems and methods can determine the "best" or most efficient route to take based on one or more priorities, make driving recommendations to the operator, and/or automatically control one or more systems (e.g., engine, brakes, transmission, etc.) of the vehicle. The systems and methods can calculate the "best" route based on predefined trip requirements, including cost, schedule, route preferences, and/or risk of potential delays, etc.

20 Claims, 5 Drawing Sheets

(51) Int. Cl.
*B60W 10/184* (2012.01)
*B60W 50/00* (2006.01)
*B60W 50/14* (2012.01)
*G01C 21/34* (2006.01)
*B60K 6/445* (2007.10)
*B60W 30/14* (2006.01)

(56) References Cited

U.S. PATENT DOCUMENTS

| | | |
|---|---|---|
| 5,931,886 A | 8/1999 | Moroto |
| 6,009,374 A | 12/1999 | Urahashi |
| 6,070,118 A | 5/2000 | Ohta |
| 6,085,137 A | 7/2000 | Aruga |
| 6,092,021 A | 7/2000 | Ehlbeck et al. |
| 6,098,005 A | 8/2000 | Tsukamoto |
| 6,182,000 B1 | 1/2001 | Ohta |
| 6,199,001 B1 | 3/2001 | Ohta |
| 6,275,760 B1 | 8/2001 | Saito |
| 6,278,928 B1 | 8/2001 | Aruga |
| 6,516,261 B2 | 2/2003 | Ohashi |
| 7,146,264 B2 | 12/2006 | Bates |
| 7,346,438 B2 | 3/2008 | Berglund |
| 7,480,552 B2 | 1/2009 | Bates |
| 2001/0049573 A1 | 12/2001 | Ohashi |
| 2002/0143454 A1* | 10/2002 | Bates et al. ............ 701/51 |
| 2004/0093264 A1 | 5/2004 | Shimizu |
| 2006/0030450 A1 | 2/2006 | Kyle |
| 2006/0276951 A1 | 12/2006 | Berglund |
| 2007/0135996 A1 | 6/2007 | Bates |
| 2007/0174004 A1 | 7/2007 | Tenzer |
| 2009/0216396 A1 | 8/2009 | Yamagata |
| 2010/0198508 A1* | 8/2010 | Tang ..................... 701/210 |

* cited by examiner

SYSTEMS AND METHODS FOR IMPROVING THE EFFICIENCY OF A VEHICLE

BACKGROUND

The inefficient use of vehicles can results in higher fuel consumption than is needed and may result in increased operating costs. In the field of surface transportation and particularly in the long-haul trucking industry, even small improvements in fuel efficiency can reduce annual operating costs significantly. More efficient use of the vehicles also have the added benefits of reducing environmental pollutants.

Over the years, numerous means have been sought to improve the fuel-efficiency of internal combustion powered vehicles. These have included aerodynamic fairings and the like to reduce drag, reduction in component parts and the use of lighter materials to reduce weight, turbocharged engines, direct fuel injection, and hybrid powertrains. The surface transportation industry is constantly looking for other means for improving fuel efficiency in vehicles.

SUMMARY

While the primary focus of recent technological advances in fuel efficiency have focused on utilizing different types of fuel sources and/or improving the efficiency in which mechanical components consume fuel, excess fuel may be consumed because of inefficiencies caused by, for example, a vehicle operator, accelerating/decelerating too rapidly or otherwise failing to maintain the engine speed at or near an optimal level. Therefore, aspects of the present disclosure are directed to assisting the vehicle operator to increase fuel efficiency by, for example, changes in driver behavior. Additionally or alternatively, aspects of the present disclosure are directed to controlling vehicle systems to increase fuel efficiency by, for example, reducing speeds, limiting acceleration, etc.

In accordance with one aspect of the present disclosure, a method is provided. The method comprises the calculation of an optimized vehicle route based on a vehicle starting location and a vehicle ending location using data from one more sources. In one embodiment, the one or more sources of data are indicative of one or more vehicle attributes and one or more GPS data types including route length or one or more route characteristics. The method also includes displaying the optimized vehicle route on a vehicle display. During vehicle travel, the method further includes monitoring one or more of the GPS data types and vehicle parameter data including acceleration, speed, or gear selection, and combinations thereof, and prompting the vehicle operator via a human-machine interface to operate the vehicle in a more efficient manner.

In accordance with another aspect of the present disclosure, a method for a vehicle having an engine and a transmission is provided. The method includes calculating an optimized vehicle route based on a vehicle starting location and a vehicle ending location using data from one or more sources. In one embodiment, the one or more sources of data are indicative of one or more vehicle attributes and one or more GPS data types including route length or one or more route characteristics. The method also includes generating an operational profile for the calculated route. During vehicle travel, the method further includes monitoring one or more of the GPS data types and vehicle parameter data including acceleration, speed, or gear selection, and combinations thereof, and controlling the engine and/or transmission to operate the vehicle in a manner that matches the operational profile.

In accordance with yet another aspect of the present disclosure, a system is provided. The system comprises one or more sensors for generating data indicative of vehicle attributes, one or more sensors for generating data indicative of vehicle parameters, a data acquisition unit that receives location data, and one or more controlling components. The one or more controlling components may be configured to: i) obtain data indicative of one or more vehicle attributes; ii) calculate an optimized vehicle route based on a vehicle starting location and a vehicle ending location using data from one more sources, wherein in one embodiment the one or more sources of data are indicative of one or more vehicle attributes and one or more GPS data types including route length or one or more route characteristics; iii) monitor one or more of the GPS data types and vehicle parameter data including acceleration, speed, or gear selection, and combinations thereof; and iv) prompt the vehicle operator for one or more vehicle parameter modifications.

This summary has been provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended only as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

The following discussion proceeds with reference to examples of an operational efficiency and/or control systems and methods for vehicles, such as Class 8 trucks. In order to, for example, improve fuel efficiency when traveling in a fuel powered vehicle from point A to point B, the systems and methods of the present disclosure can determine the "best" or most efficient route to take based on one or more priorities, make driving recommendations to the operator, and/or automatically control one or more systems (e.g., engine, brakes, transmission, etc.) of the vehicle. In one embodiment, the systems and methods can calculate the "best" route based on predefined trip requirements, including cost, schedule, route preferences, risk of potential delays, etc., and combinations thereof. To calculate the "best" route, the systems and methods described herein may utilize a number of vehicle parameter data and other data, including but not limited to data indicative of vehicle drag, vehicle load, fuel usage, Brake Mean Effective Pressure (BMEP), route characteristics from enhanced GPS data, weather, traffic, historical vehicle trends, and routes, and/or the like, and combinations thereof.

In several embodiments, after the "best" route is calculated, one or more vehicle operational profiles can be generated based on the calculated route. The vehicle operational profiles can represent a preselected level, such as a minimum, optimum, etc., of the vehicle operational characteristics that will achieve, for example, a preselected fuel efficiency goal for the route. The one or more vehicle operational profiles can take into consideration one or more factors relating to the route, including but not limited to road grades, speed limits, traffic signals, and/or other types of route characteristics obtained from the enhanced GPS data. It will be appreciated that the vehicle operational profiles can be generated from performance models, vehicle performance look-up tables pertaining to one or more vehicle parameters and/or the like. The vehicle parameters can include but are not limited to vehicle speed, gear ratio, vehicle load, acceleration, engine speed, etc. When using multiple factors to determine the profiles, each factor can be weighted based on its influence on fuel efficiency, if desired.

In some embodiments, when traveling along the "best" route, the system can offer recommendations to the operator via a human-machine interface (HMI), such as a display, speakers, etc, such recommendations may include changing gears, maintaining a certain speed, reducing acceleration, etc., for improving fuel efficiency. For example, the system could utilize the HMI to prompt the vehicle operator for the most efficient vehicle operating conditions (e.g., rpm, gear selection, acceleration profile, etc.). In one embodiment, the system can monitor data in real time or near real time to determine whether the vehicle can be operated in a more efficient manner. Alternatively, the monitored data can be compared to the vehicle operational profile, and if the current data deviates from the profile, the operator can be notified.

In other embodiments, the system can automatically control one or more of the vehicle subsystems to satisfy fuel efficiency requirements, scheduled delivery time, or other priorities, etc. For example, the system can automatically control the brakes, the fuel delivery system, the throttle body (if so equipped), the transmission and/or the like to achieve better fuel efficiency, maintain delivery time and/or the like. Control by the system may occur without prompting the driver for driving modifications via the HMI or may occur after the driver has been prompted by the HMI and no corrective action has been detected. Such control in one embodiment can be based on the results of comparing current monitored data to the vehicle operational profile.

It will be appreciated that aspects of the disclosed subject mater have wide application, and therefore, may be suitable for use with any type of vehicle, such as passenger vehicles, buses, light, medium, and heavy duty vehicles, boats, yachts, motor homes, etc. Accordingly, the following descriptions and illustrations herein should be considered illustrative in nature, and thus, not limiting the scope of the claimed subject matter.

Prior to discussing the details of various aspects of the present disclosure, it should be understood that several sections of the following description are presented in terms of logic and operations that may be performed by conventional electronic components. These electronic components, which may be grouped in a single location or distributed over a wide area, generally include processors, memory, storage devices, display devices, input devices, etc. It will be appreciated by one skilled in the art that the logic described herein may be implemented in a variety of configurations, including but not limited to hardware, software, or a combination of hardware and software. In circumstances were the components are distributed, the components are accessible to each other via communication links.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 2:
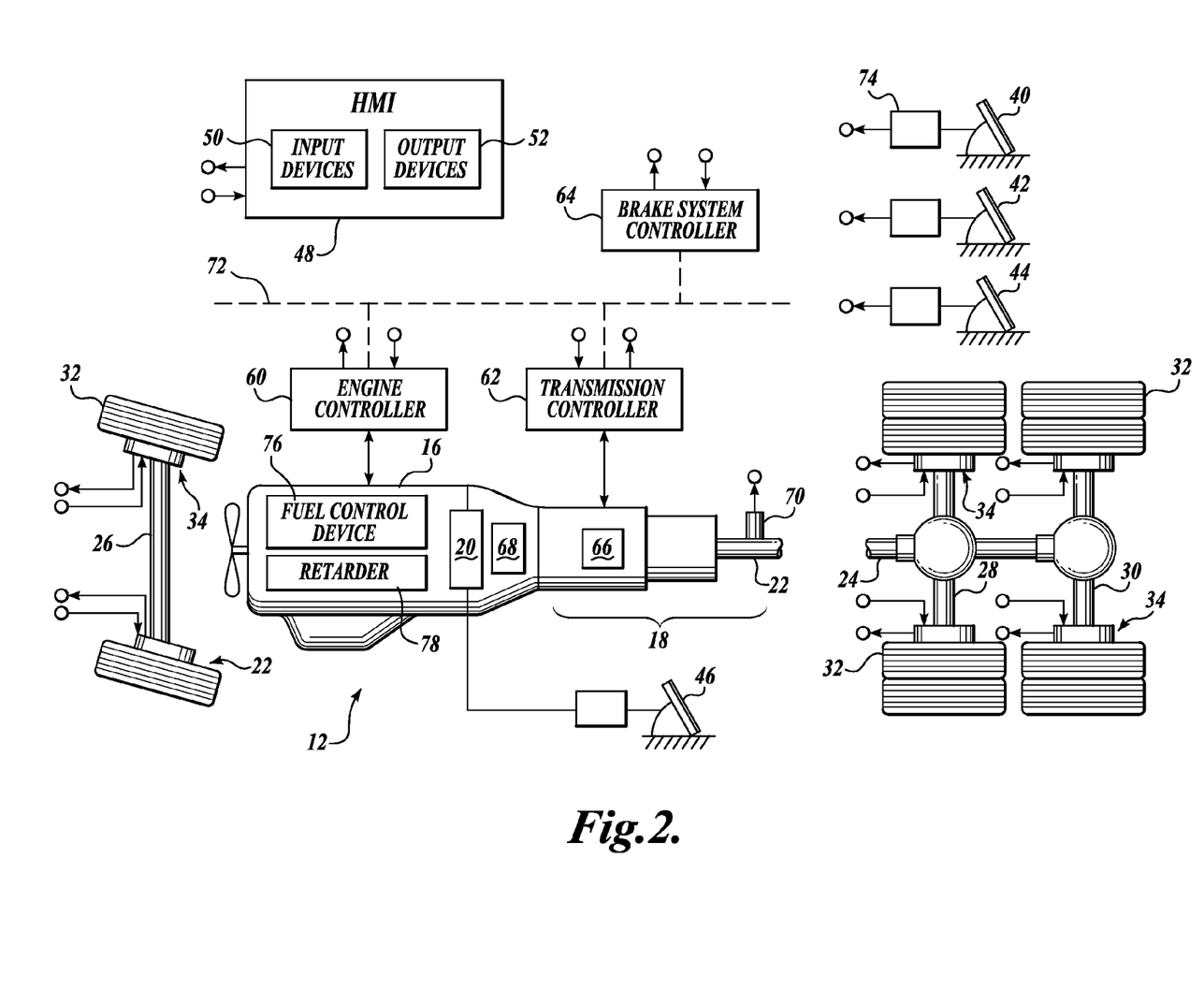
FIG. 2 is a schematic diagram of one suitable vehicle in which the system of FIG. 1 may be employed.

As briefly described above, one or more embodiments of the present disclosure are generally directed to systems and methods for improving fuel economy, which are suitable for use in a vehicle. One suitable vehicle in which such systems may be employed will now be described in more detail with reference to FIG. 2. As best shown in FIG. 2, a Class 8 tractor 12 having an electronically controlled engine 16 coupled to a transmission 18 via a clutch mechanism 20 is shown. Although a vehicle such as depicted in FIG. 2 represents one of the possible applications for the systems and methods of the present disclosure, it should be appreciated that aspects of the present disclosure transcend any particular type of vehicle.

In the embodiment shown in FIG. 2, the transmission 18 may be a manual transmission, an automated manual transmission, or an automatic transmission that includes an output shaft 22 coupled to a vehicle drive shaft 24. The tractor 12 includes at least two axles such as a steer axle 26 and at least one drive axle, such as axles 28 and 30. Each axle supports corresponding wheels 32 having service brakes 34 and associated components. The associated components of the service brakes 34 may include wheel speed sensors, electronically controlled pressure valves, and the like, to affect control of the vehicle braking system.

The tractor 12 may also include conventional operator control inputs, such as an accelerator pedal 38, a service brake pedal 40, a parking brake 42, and an optional clutch pedal 46. The tractor 12 may further include a cab mounted operator interface or human machine interface 48 ("HMI 48"), which may include any of a number of input devices 50, such as toggle switches, push button switches, potentiometers, touchscreen displays, or the like The cab mounted operator interface or HMI also includes various output devices 52, such as visual output devices (e.g., lights, displays, gauges), audible output devices (e.g., speakers, headphones, etc.) and haptic feedback devices. One or more input devices 50 and/or output devices 52 may be stand alone, integrated with the instrument panel, with a rear view minor or a side view mirror, mounted in, on or over a hood of the vehicle, and/or located and/or integrated with any other suitable structure in the vehicle.

The tractor 12 may be further equipped with a vehicle control system that controls several systems and/or subsystems of the vehicle. For example, the vehicle control system may include a controller associated with the engine 16 ("engine controller 60"). Generally described, the engine controller 60 functions to manage various aspects of the operation of the engine 16. For example, the engine's ignition timing, fuel delivery, and the like, may be monitored and controlled by the engine controller 60. The engine controller 60 may also monitor various engine operating parameters, such as temperature, intake manifold pressure, oil pressure, etc. To that end, the engine controller 60 typically receives signals from a variety of sensors, including but not limited to wheel speed sensors (not shown in FIG. 2) of the brake components 34, an engine speed sensor 68, an accelerator pedal position sensor 74, etc., either directly or by other system or device controllers (i.e., transmission controller 62, brake unit controller 64, etc.), processes such signals and others, and transmits a variety of control signals to devices including but not limited to one or more fuel control devices 76 that selectively supply fuel to the internal combustion engine 16, an engine retarder 78, such as a jake brake, etc. The engine controller 60 may also calculate fuel efficiency, such as miles per gallon, from the engine operating data and/or other vehicle operation data, such as transmission output speed, etc., according to techniques known in the art.

As will be described in more detail below, the engine controller 60 may transmit signals indicative of vehicle operational data (e.g., engine speed, throttle position and/or accelerator pedal position, fuel efficiency data, etc.) to other system controllers via a vehicle area network (VAN) 72 and may receive control signals from controllers of other vehicle subsystems either directly or via VAN 72 to affect the operation of the internal combustion engine 16. It will also be appreciated that other controllers, such as general purpose controllers, or other system level controllers, such as controller 114 later described, can receives signals from such sensors either directly or from the engine controller 60 or other device controllers (i.e., transmission controller 62, etc.).

The vehicle control system may include other controllers for controlling other vehicle systems. For example, the vehicle control system may include a transmission controller 62 for controlling transmission shifting in automated manual and automatic transmission embodiments and a brake system controller 64 for controlling the operation of the service brakes 34. In that regard, the transmission controller 62 may receive data from a sensor 66 that senses the currently selected gear, a sensor (not shown) that senses transmission input shaft speed (which can alternatively be the engine sensor 68), and a sensor 70 that senses transmission output shaft speed. The brake system controller 64 may receive data from the wheel speed sensors, tire pressure sensors, etc., which are not shown for ease of illustration but well known in the art. It will be appreciated that in several embodiments, sensor 66 may be omitted and the currently selected gear can be calculated by the output data of the sensors 68 and 70 as known in the art.

Figure 3:
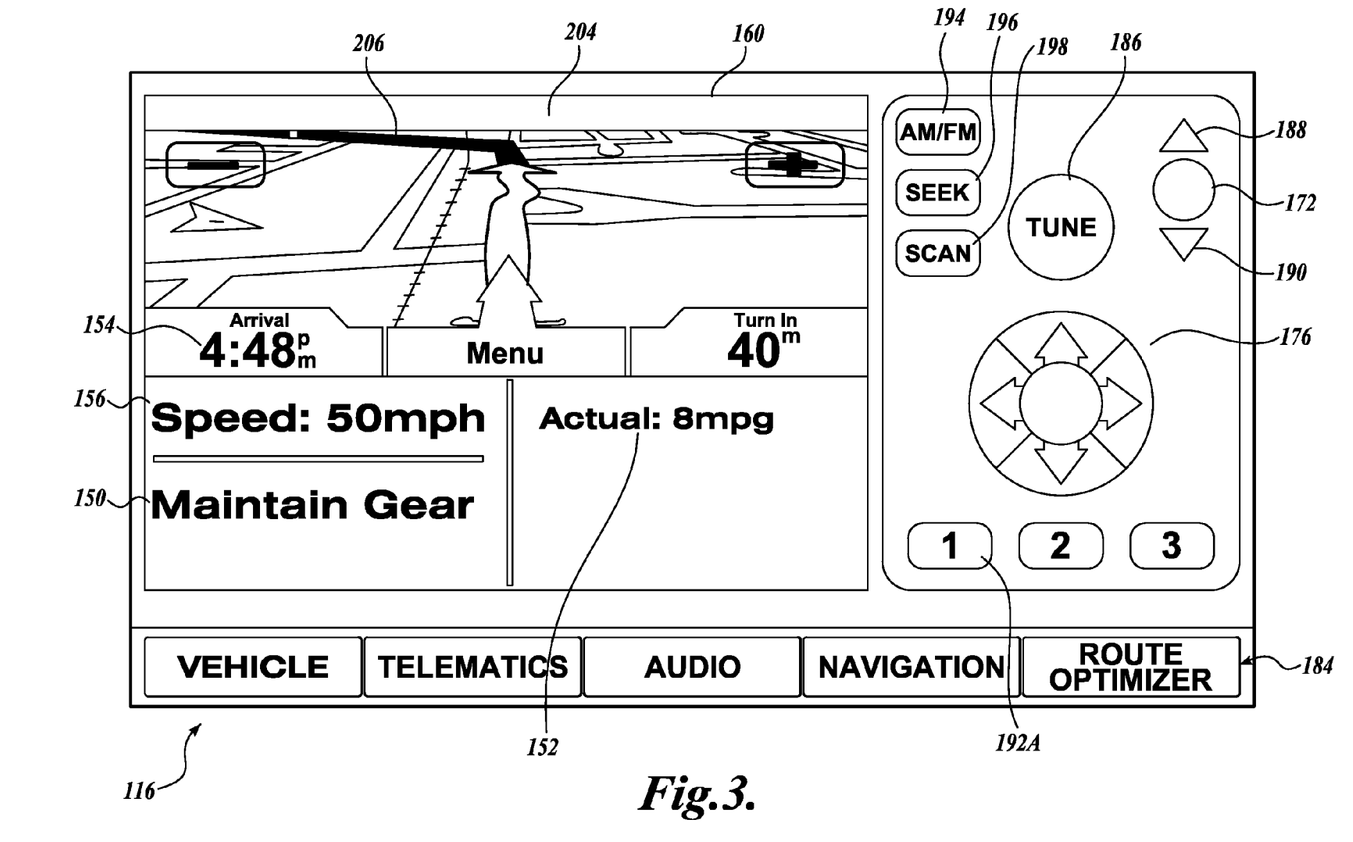
FIG. 3 is one example of a human machine interface formed in accordance with aspects of the present disclosure, which is suitable for use with the system of FIG. 1.

The various controllers may communicate with each other through the vehicle area network 72, as shown in FIG. 3. Those skilled in the art and others will recognize that the vehicle area network 72 may be implemented using any number of different communication protocols such as, but not limited to, Society of Automotive Engineers' ("SAE") J1587, SAE J1922, SAE J1939, SAE J1708, and combinations thereof. Alternatively, the aforementioned controllers may be software control modules contained within a general purpose controller or controllers residing on the vehicle. It will be appreciated, however, that the present disclosure is not limited to any particular type or configuration of controller, or to any specific control logic for governing operation of vehicle 12.

As used herein, controllers, control units, control modules, program modules, etc., can contain logic for carrying out general or specific operational features of the present disclosure. The logic can be implemented in hardware components, such as analog circuitry, digital circuitry, processing units, or combinations thereof, or software components having instructions which can be processed by the processing units, etc. Therefore, as used herein, the term "controlling component" can be used to generally describe these aforementioned components, and can be either hardware or software, or combinations thereof, that implement logic for carrying out various aspects of the present disclosure.

Figure 1:
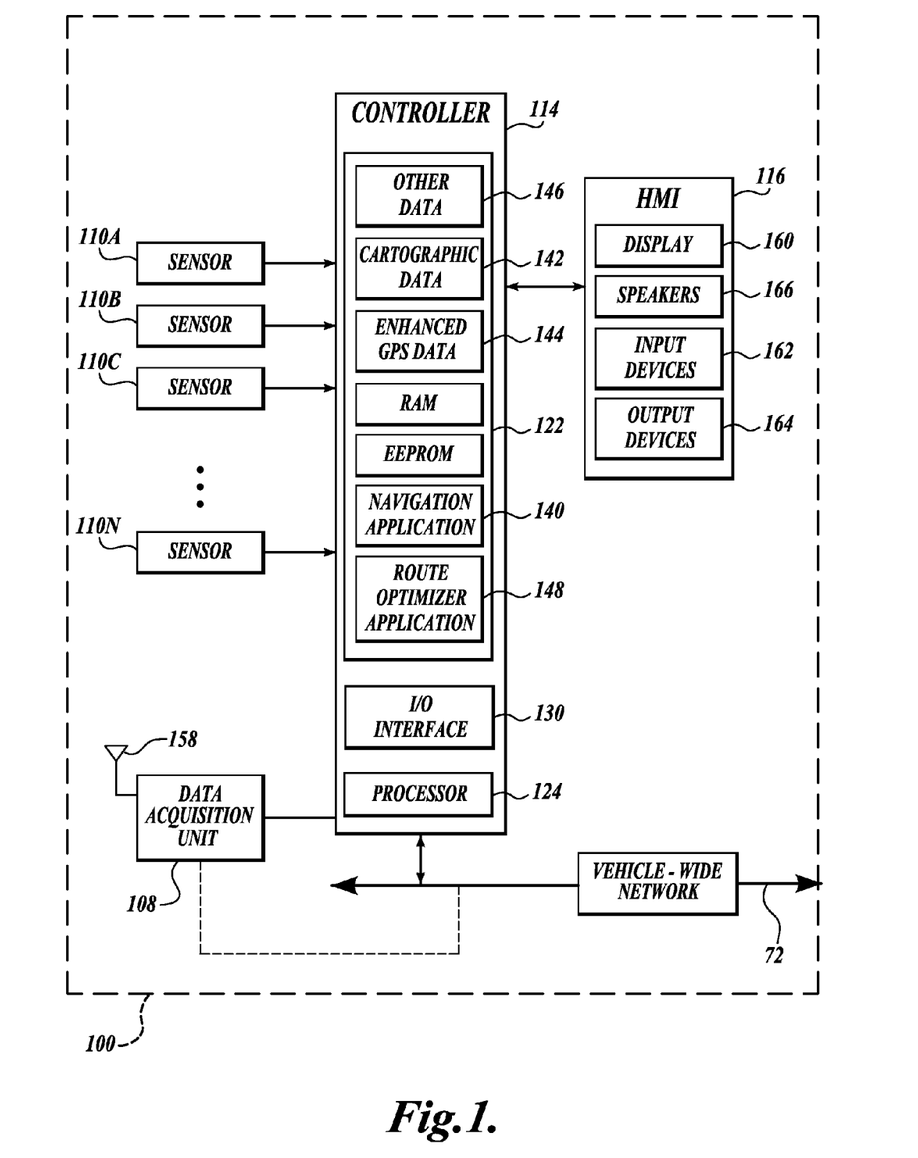
FIG. 1 is a block diagram of one example of a system formed in accordance with aspects of the present disclosure.

Returning now to FIG. 1, there is shown a block diagram of one exemplary embodiment of a system 100 formed in accordance with aspects of the present disclosure, which may be incorporated into a vehicle, such as tractor 12 (FIG. 2). As shown in FIG. 1, the system 100 includes a data acquisition unit 108, one or more data generating sensors 110A-110N, at least one controller 114, and a human machine interface (HMI) 116 for exchanging information between the operator and the other components of the system 100.

Still referring now to FIG. 1, the components of the system 100 will now be described in more detail. As best shown in FIG. 1, the system 100 includes a data acquisition unit 108 that comprises one or more receivers or transceivers that receives, for example, relative vehicle location data (e.g., GPS data), traffic and/or weather data, etc. In some embodiments, the data acquisition unit 108 may receive other data for carrying out the functionally of the system including but not limited to enhanced GPS data (e.g., speed limits, road grades, etc.), fleet manager data (e.g., fuel mileage requirements, delivery schedules, etc.) and the like. In other embodiments, the data acquisition unit 108 may transmit data remotely for processing or other steps for carrying out the functionality of the system. Data from remote processing locations also may be received by data acquisition unit 108 and forwarded to the appropriate system controller.

The data acquisition unit 108 in one embodiment acts like a vehicle positioning system for identifying the relative location of the vehicle and generating vehicle position indicating signals relative to a fixed coordinate system. The data acquisition unit 108 may include a Global Positioning System (GPS) to carry out this functionality. The data acquisition unit 108 also preferably includes a position translation system that is able to identify the position of the vehicle relative to roads, cities, and/or any other criteria based on the output of the vehicle positioning system. The data acquisition unit 108 can also be a cellular based system or any other system that identifies the location of the vehicle relative to a fixed coordinate system. The data acquisition unit 108 may further include a data store having lookup information and/or other structured data and/or tables regarding, for example, route data, cartographic data, etc.

The data acquisition unit 108 of the system 100 is communicatively connected to the controller 114. The controller 114 may also be communicatively connected to other systems of the vehicle 12 via the vehicle area network 72. The controller 114 may contain logic rules implemented in a variety of combinations of hardware circuitry components, software and/or programmed microprocessors, etc., for carrying out various aspects of the present disclosure described herein. To that end, as further illustrated in FIG. 1, one suitable embodiment of the controller 114 includes a memory 122 with a Random Access Memory ("RAM"), an Electronically Erasable, Programmable, Read-Only Memory ("EEPROM"), and any other suitable data storage means, a processor 124, and one or more applications or program modules for providing functionality to the vehicle. The processor 124 and memory 122 of the controller 114 are connected by an input/output (I/O) interface 130 to other devices and/or modules of the vehicle 12.

In the embodiment shown in FIG. 1, the memory 122 stores a navigation application 140 that includes program logic for generating navigation maps in relation to vehicle position for display by the HMI 116. Additionally, the application 140 includes program logic for calculating a route in response to operator input of start/end locations (e.g., addresses, latitude/longitude data, etc.), including the route length and estimated travel time thereof. The memory 122 also stores various cartographic data 148 corresponding to thoroughfares, routes, terrain, and other general navigation data to facilitate the various navigation functions provided by the system 100, including route calculation. Additionally, the memory 122 may include stored destinations, destination addresses, and previously calculated or otherwise acquired routes to various destinations or destination addresses for later retrieval by the processor 124.

The memory 122 may store "enhanced" data GPS data 144 to be accessed by the processor 124. Enhanced data may include but is not limited to route characteristic data such as speed limits, road grades, elevation gain, traffic signs and/or signals, interchanges, converging lanes, etc. As such enhanced GPS data may be associated with each location (i.e., coordinates) along a give route. This data can be permanently stored on memory 122 or any associated computer readable media, such as flash memory, CD/DVD, etc. Alternatively, this data, as well as weather data, traffic data, etc., may be accessed via wireless protocols from a remote data store, satellite or other broadcast medium, etc., via the data acquisition unit 108 or other vehicle systems that are capable of sending and receiving data. The data received by data acquisition unit 108 or other suitable vehicle systems is temporarily stored on memory 122 for access by the processor 124.

Other data 146 may be stored locally in memory 122 or received from a remote data store. For example, historical data 146 indicative of fuel efficiency trends, acceleration profiles, etc., from previous trips that traverse the same or substantially the same route, carry the same or similar payload, etc. may be employed. Additionally or alternatively, data indicative of the relationship between fuel efficiency and engine speed, load, gear ratio, vehicle speed over time (i.e., acceleration profiles), etc., may be stored, for example, in one or more single or multi-dimensional performance maps or look-up tables (LUTs).

In the embodiment shown in FIG. 1, the memory 122 also stores a route optimizer application 148. As will be described in more detail below, the route optimizer application 148 includes instructions that when executed by the processor 124, cause the system to perform one or more functions. In one embodiment, the route optimizer application 148 is capable of graphically displaying information to and requesting and/or receiving data from the operator via the HMI, analyzing data received from the system components, and/or generating control signals to be transmitted to the components of the system 100 through the I/O interface 130. In carrying out the one or more functions herein described, the route optimizer application 148 may interact with navigation application 140 and/or access stored data, such as cartographic data, historical fuel efficiency data, enhanced GPS data, etc.

In one embodiment, the route optimizer application 148 includes instructions that when executed by the processor 124, cause the procurement of start/end locations points and data from one or more sources. These sources may include but are not limited to vehicle parameter data (e.g., weight, gearing, engine operating data, BMEP data, etc.), detailed or enhanced GPS data, including route length and route characteristics (e.g., grade changes, number of stops, including stop signs, stop lights, etc., speed limits, number of interchanges, etc.) weather, traffic, and historical vehicle trends and/or routes. With such data, the application 148 determines the "best" or most efficient route to take based on one or more preselected or driver initiated priorities (e.g., fuel efficiency guidelines, scheduled delivery times, etc.). FIG. 3 illustrates one example of an HMI 116 displaying a navigation map 204 and a calculated "best" route 206.

As will be described in more detail below, the application 148 may further include instructions that when executed by the processor 124, cause the system to calculate one or more vehicle operational profiles that represents the vehicle operating parameters (over time or distance) relating to engine speed, vehicle speed, gear selection, engine acceleration, vehicle acceleration and/or braking that will satisfy predefined trip requirements, including but not limited to fuel efficiency, and/or schedule. It will be appreciated that a single vehicle operational profile may be associated with the "best" route. Alternatively, the "best" route may be broken into discrete sections and one vehicle operational profile may be associated with each discrete section. In other embodiments, one or more vehicle operational profiles may be associated with areas of the "best" route that has the greatest affect on fuel efficiency. For example, the one or more vehicle operational profiles may be associated with portions of the route that represent uphill road grades, stop signs, stop lights or any other situation that may require the vehicle to accelerate.

The application 148 may further include instructions that when executed by the processor, cause the system to provide additional functionality. In that regard, when the vehicle is traveling along the "best" route, the route optimizer application 144 in some embodiments can monitor various vehicle parameter data, driver behavior data, and enhanced GPS data, and can provide driving recommendations to the operator via a human-machine interface (HMI) to improve vehicle efficiency or scheduled delivery time. In one embodiment, this monitored data can be compared to the vehicle operational profile to determine whether a recommendation is outputted to the operator. If a recommendation is to be provided to the operator, the route optimizer application 148 may cause the display to graphically display recommendations to the operator, such as change gears, recommended speed, timing and quantity of braking, acceleration, etc. FIG. 3 illustrates one example of display recommendations, such as maintain gear 150, as well as displaying, for example, current fuel economy 152 of the system, estimated time of arrival 154, and current speed 156 of the vehicle. In other embodiments, the recommendation can be outputted to the operator audibly over speakers 166 (FIG. 1), etc.

The route optimizer application 144 may further include instructions that when executed by the processor, cause the system to automatically control one or more of the vehicle subsystems to satisfy fuel efficiency requirements, scheduled delivery time, or other priorities, etc. In one embodiment, the route optimizer application 144 can cause the generation and transmission of appropriate control signals to affect brake control, throttle control, fuel delivery control, transmission control, etc., to achieve better fuel efficiency, delivery time, etc. Such control by the system may occur without prompting the driver for driving modifications via the HMI or may occur after the driver has been prompted by the HMI and no corrective action has been detected. In one embodiment, the route optimizer application 144 can cause the generation and transmission of appropriate control signals to affect brake control, throttle control, fuel delivery control, transmission control, etc., so as to match or exceed the vehicle operational profile.

Still referring to FIG. 1, the controller 114 receives data from one or more sensors 110A-N via the input/output (I/O) interface 130. The sensors 110A-N are connected in communication with the controller 114 directly through a wired or wireless link, and/or indirectly through the vehicle-wide network 72. The sensors 110A-N may include various vehicle system sensors including but not limited to any of the previously mention sensors. For example, the sensors 110A-110N may include but are not limited to brake sensors, a throttle sensor, an accelerator pedal position sensors, tire pressure sensor, vehicle inertial sensor(s), fuel flow sensors, fuel tank level sensors, wheel speed sensors, an engine speed sensor, a vehicle speed sensor, a transmission gear sensor, temperature sensors, accelerometers, vehicle passenger load and/or payload sensors, etc.

The system 100 further includes a human machine interface (HMI) 116 communicatively connected to the controller 114 via input/output (I/O) interface 130. The HMI 116 may be separate from the HMI 48 (FIG. 2) or may include components thereof or vice versa. The HMI 116 includes a plurality of input devices 162 or components, such as switches, buttons, knobs, etc., for operating the system 100. The HMI 116 also includes output devices 164 or components, such as one or more light emitting diodes (LEDs), speakers 166, and the like. The HMI 116 further includes a display 160, such as a liquid crystal display (LCD), a light emitting polymer display (LPD), or the like, for displaying content (e.g., maps, calculated routes, instructions and the like, etc.) to the operator.

In one embodiment shown in FIG. 3, the input devices 162 of the HMI 116 include an ON/OFF controller knob 172, a scroll wheel 176, and a route optimizer button 184. In that regard, the scroll wheel 176 is coupled with the processor 124 so that depressing the buttons of the scroll wheel 176 causes activation of menu items and selection of virtual buttons on display 160, selects controls, or otherwise interacts with graphical elements that are presented on the display 160 to provide input. In one embodiment, the scroll wheel 176 can interact with a virtual QWERTY keyboard or alphanumeric keypad displayed on the display 160 for inputting names, addresses, or locations of start/end destinations, etc., using any combination of the letters, numbers or symbols which are available on the keyboard or keypad. Likewise, the route optimizer button 184 is coupled with the processor 124 so that depressing the button 184 launches one or more applications, including the application 148.

The HMI 116 may include other input devices 162 for carrying out the operation of other vehicle systems, such as an entertainment system, infotainment system, Telematics system, etc. For example, the input devices 162 may include a tuning knob 186, volume control buttons 188 and 190, a plurality of tuner preset buttons 192A-192N, AM/FM button 194, seek button 196, scan button 198, and other programmed input device. It will be appreciated these and other buttons, switches, etc. can be programmed for other functions, as known in the art.

In one embodiment, the display 160 may also be configured as an input device for receiving commands from the operator to be processed by the controller 114. In one embodiment, the display 160 may include a touch sensitive layer on the screen that is configured to receive input from the user. In typical embodiments, the touch sensitive layer is configured to recognize a user's touches applied to the surface of the layer. For example, the position of the touches, the pressure of the touches, general direction of the touches, and the like are recognized by the touch sensitive layer. In one embodiment, the functionality of one or more inputs devices can be carried out by icons presented by the touch screen display and activated by an operator's finger, a stylus, etc. In another embodiment, the operator may interact with the virtual keyboard or keypad displayed on the display 160 via a finger, stylus, etc.

Thus, the HMI 116 enables the operator and the system 100 to exchange information. For example, the HMI 116 can be used to enter data, to request and display content, such as navigation information, vehicle operation data, delivery schedule data, play audio or provide audible directions, output driving style recommendations, among others. As those skilled in the art will appreciate, the HMI 116 outlined above is meant to be representative and to not reflect all possible components of an HMI that may be employed. In embodiments where the system 100 is mounted within a vehicle, the input devices can be positioned in any well known location, such as on the dash, as best shown in FIG. 3, the steering wheel and/or the like.

Figure 4:
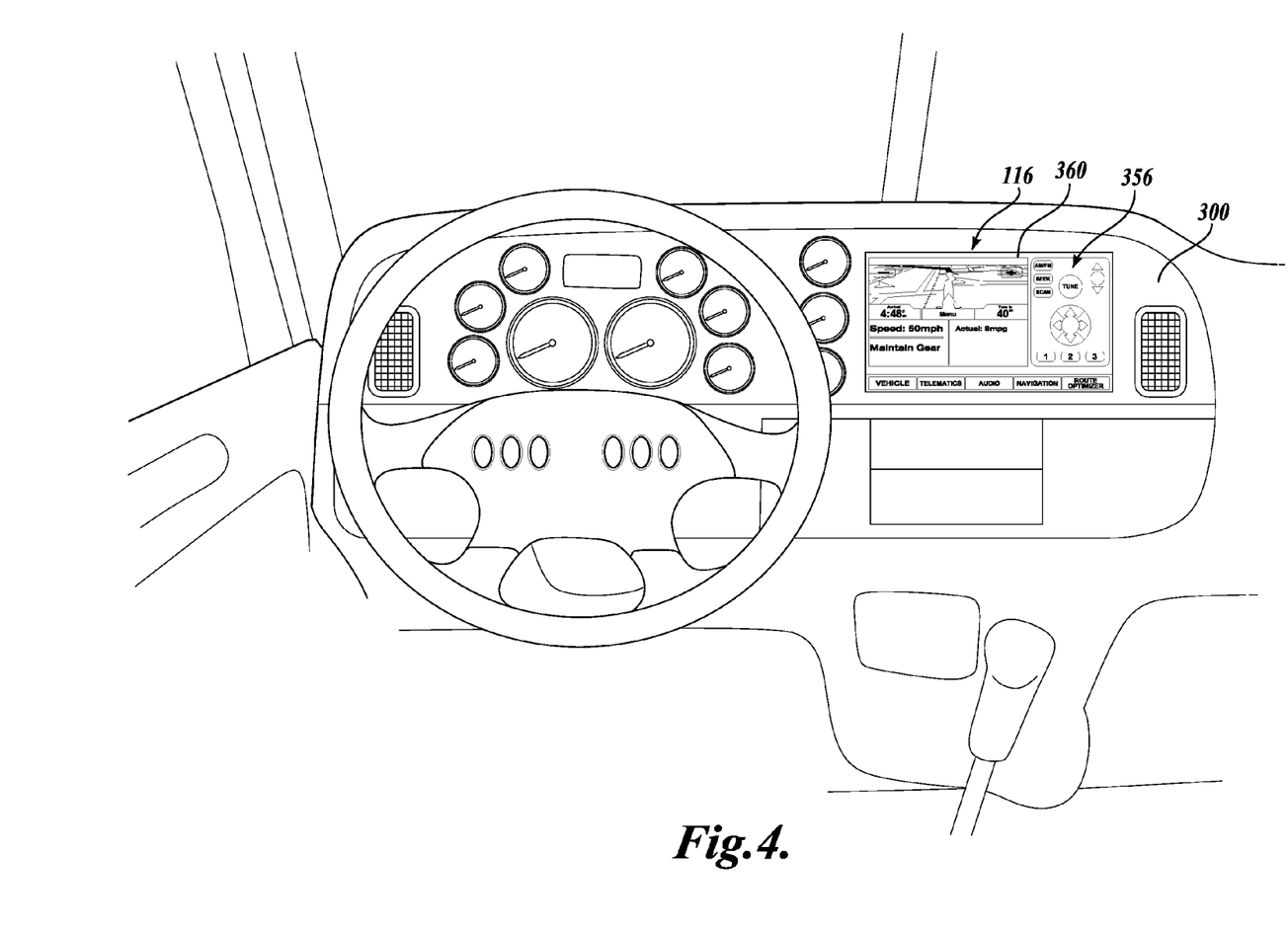
FIG. 4 is a schematic diagram depicting the human machine interface of FIG. 3 mounted within the dash of a vehicle.

With reference now to FIG. 4, an exemplary implementation of the HMI 116 is shown mounted and integrated in a vehicle. In one embodiment, the HMI 116 is mounted in a vehicle dash 300 at a location that may be accessed by a vehicle operator and/or vehicle passenger. In this regard, the HMI 116 includes a display 360 which utilizes controls and graphics to display information and obtain input from the user. Accordingly, a user may activate menu items, click buttons, select controls, or otherwise interact with graphical elements that are presented on the display 360 to provide input. The HMI 116 also depicts one or more input devices 356, such as buttons, scroll wheels, knobs, etc., mounted adjacent to the display 360.

Figure 5:
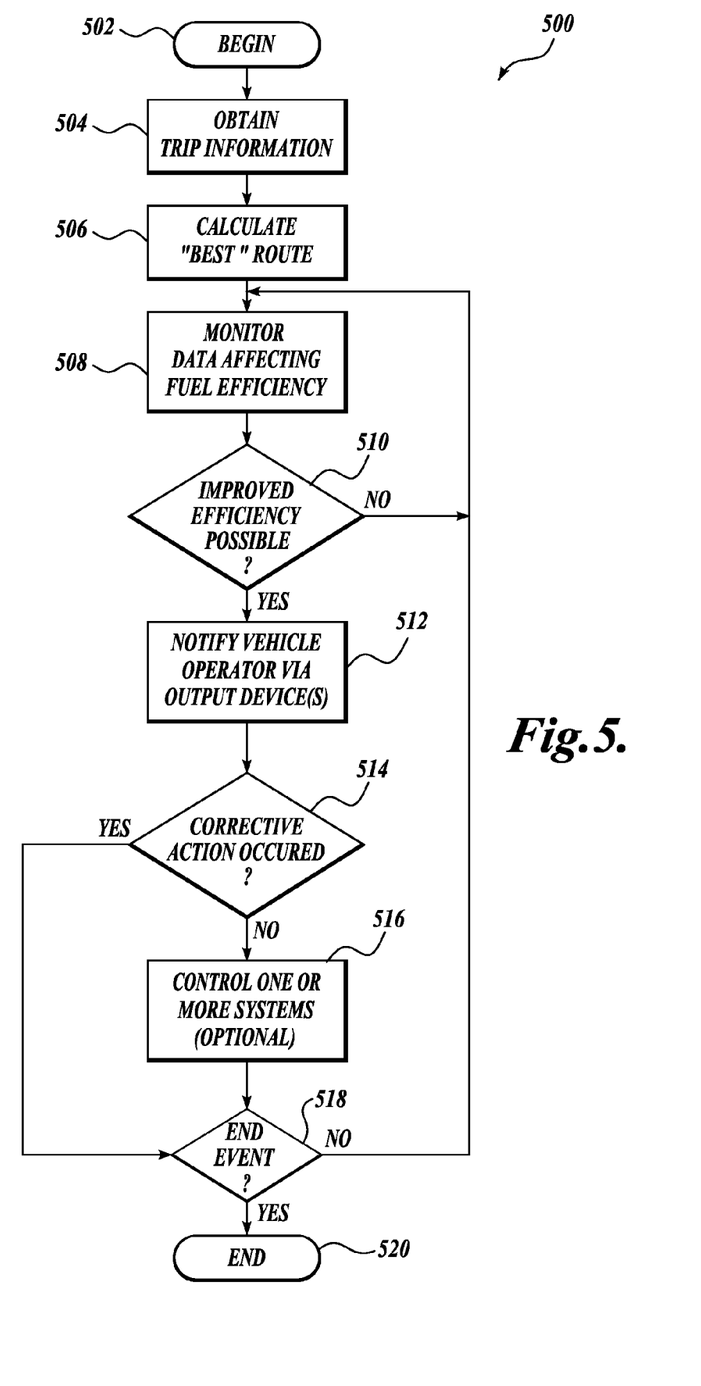
FIG. 5 is a flow diagram of one exemplary method that may be implemented by the system in accordance with aspects of the present disclosure.

Referring now to FIG. 5, there is shown a flow diagram of one exemplary method 500 that may be carried out by one or more controllers, includes controller 114 via execution of one or more of applications, such as the navigation application 140 and/or the route optimizer application 148. As described above, depression of the route optimizer button 184 (or icon on display 160, etc.) by the operator launches the route optimizer application 148, which starts method 500 at block 502. It will be appreciated that the application 148 can be launched prior to the start of a trip or subsequently thereafter.

From block 502, the method 500 proceeds to block 504, where trip information is obtained. The trip information may include end location data and beginning location data or, if different than beginning location, the current location of the vehicle. In one embodiment, the trip information can be obtained from the navigation application. For example, the operator may have employed the navigation application 140 to generate a route based on trip information entered via the HMI prior to depression of the route optimizer button 184. In this case, once the route optimizer button is depressed, the method obtains the trip information from the previously enter data. In other embodiments, the trip information can be obtained from memory (e.g., sent from fleet manager and received by the data acquisition unit), or the method can prompt the operator for this information.

Once the trip information is obtained at block 504, the method 500 proceeds to block 506, where the "best" route between the beginning or current location and the ending location is determined based on one or more priorities, including fuel economy, delivery time, risk of late delivery. Risks associated with later delivery may include routing through metropolitan area during rush hour, impending storms in the delivery area, and/or other traffic related complications, etc. To determine the "best" route data from various sources can be obtained. Such data may included but is not limited to one or more of the following: vehicle attribute data, enhanced GPS data, such as route length and route characteristic data, weather data, traffic data, and historical vehicle trend data and/or route data. The vehicle attribute data may include but is not limited to including but not limited to current fuel level data, vehicle weight data, including passenger and payload weight, tire pressure data, wind speed data, ambient external temperature data, vehicle type data (e.g., flatbed, refrigeration, etc.), engine and transmission type data, vehicle drag data, Brake Mean Effective Pressure (BMEP) data and/or the like. With this data, the "best" route may be calculated utilizing one or more suitable route optimization models and/or look-up tables, etc., that can be programmed by one skilled in the art. Alternatively, the "best" route may be obtained by retrieving a previously calculated route from the memory 122, or utilizing a user or third-party route provided through the HMI 116.

As known in the art, the calculated route generally includes a route through one or more thoroughfares to the destination and may be communicated to the user through the HMI 116 or stored within the memory 122. As visibly communicated to the operator, the calculated route 206 (FIG. 3) may be presented as a highlighted line, dashed line, etc., overlaying the map 204 on the display 160. The route may also be audibly communicated to the operator as directions via speakers. In one embodiment, one or more optimized vehicle operational profile can also be generated at block 506. The one or more profiles, as a function of time and/or distance, relates one or more vehicle parameters (e.g., engine speed, gear selection, acceleration, etc) to the characteristics of the route to be traversed, indicating the optimal, or in some embodiments, acceptable operational parameter values that can meet or exceed pre-trip goals and/or priorities. In several embodiments, the method 500 takes into consideration road grades, speed limits, and/or other types of route characteristics obtained from enhanced GPS data to generate the one or more vehicle operational profiles.

The method then proceeds to block 508. At block 508, one or more sources of data that may affect fuel efficiency and/or delivery time is monitored. For example, as the system 100 travels along the calculated route between the start and end locations, driver behavior data, weather and traffic data, enhanced GPS data, and other data are obtained by the various components of the systems continuously or in predetermined intervals (e.g., 0.1 second, 1 second, 1 minute, 10 minutes, etc.) and processed, for example, by the processor 124. Additionally or alternatively, vehicle operational data may be obtained directly from one or more of sensors 110A-110N or from other vehicle systems via the vehicle area network 72. Some or all of the obtained data may be stored in memory 122.

Next, at block 510, a determination is made as to whether improvements in vehicle efficiency, scheduled delivery time, etc. can be achieved by driver behavior modifications (e.g., reduce speed, select proper gear, etc.). In one embodiment, the data monitored in block 508 can be compared to recommended vehicle parameter data in real time or near real time in order to make this determination. The recommended vehicle parameter data may include data from sources such as enhanced GPS data, engine speed limits, etc., that represent, for example, the recommended operational levels of vehicle operations to achieve a preselected goal for fuel efficiency. For example, if the vehicle is traveling at an engine speed (RPM) above, for example, 2200, or if the current speed of the vehicle is greater than the speed limit prescribed by the enhanced GPS data, then a recommendation to the operator to change gears and/or to reduce speed can be made.

In other embodiments, the data monitored at block 508 can be compared to the single vehicle operation profile or one or more of the discrete profiles to determine whether a recommendation is outputted to the operator at block 510. To make this determination, data indicative of engine speed, vehicle acceleration, engine acceleration, fuel usage, gear selection and/or the like can be collected over a specified distance or time, appropriately processed if necessary, and compared to the respective profile or segment or segments of the single vehicle operational profile. For example, if the vehicle is traveling at an engine speed (RPM) above 2200 for longer than, for example, five (5) minutes, or if the acceleration of the vehicle over the last ten (10) miles is outside of the limits prescribed by the enhanced GPS data and vehicle performance data stored in memory 122 then a recommendation to the operator to change gears and/or to reduce speed can be made.

If the answer is "yes" at block 510, then one or more recommendations can be outputted to the operator via a human-machine interface (HMI) at block 512. For example, FIG. 3 depicts a display 160 that outputs a "maintain gear" recommendation to the driver, or to attain a proper speed. In other embodiments, the recommendation can be outputted to the operator audibly over speakers, etc. If the answer is "no," the method returns to block 508.

Once the recommendations are outputted to the operation, the method 500 proceeds to block 514, where a decision is made as to whether any corrective action (e.g. change gears, reduce speed, etc.) has been made by the operator. If the answer is "yes," then method 500 proceeds to block 518. If the answer is "no," then the method 500 proceeds to block 516 where appropriate control signals are generated and transmitted to one or more of the vehicle subsystems to satisfy one or more of fuel efficiency requirements, scheduled delivery time, or other priorities, etc. In one embodiment, the method causes the system 100 to generate and transmits appropriate control signals to affect one or more of brake control, throttle control, fuel delivery control, transmission control, etc., to achieve better fuel efficiency. In one embodiment, one or more subsystems of the vehicle can be controlled in a manner so as to match or exceed the vehicle operation profile or portions thereof. It will be appreciated that in some embodiments, control by the system may occur without prompting the driver for driving modifications via the HMI 116.

After block 516, the method proceeds to block 518, where is test is conducted as to whether an "end" event has occurred. For example, the method 500 continues until an end event has occurred. The end event can include but is not limited to a new route or detour is requested by the operator, if the system 100 reaches the end destination of the calculated route, or the engine is an non-operational state more than a predetermined time period (e.g., five (5) minutes). If the answer to the test at block 518 is "yes," the method 500 ends at block 520, otherwise, the method returns to block 508.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. In a vehicle computing system, a method, comprising:
obtaining an optimized vehicle route based on a vehicle starting location, a vehicle ending location and data from one or more sources, the one or more sources of data indicative of one or more vehicle attributes and one or more GPS data types including route length or one or more route characteristics;
generating a vehicle operational profile representing one or more vehicle operating parameters as a function of time or distance, wherein the operational profile is based in part on the one or more route characteristics of the optimized route and includes vehicle operating parameter values of one or more of acceleration, speed, and gear selection along the optimized vehicle route or segments thereof that will meet or exceed a preselected fuel efficiency goal;
and during vehicle travel,
monitoring data including vehicle operating parameter data including at least one selected from a group consisting of acceleration, speed, and gear selection;
comparing the monitored data with the vehicle operational profile; and
notifying the vehicle operator via a human-machine interface if the monitored data deviates from the operational profile in a manner that will adversely affect fuel efficiency.

2. The method of claim 1, wherein the one or more vehicle operating parameters are selected from a group consisting of engine speed, engine acceleration, vehicle speed, vehicle acceleration, transmission gear, and vehicle load.

3. The method of claim 1, further comprising
controlling one or more subsystems of the vehicle in a manner that matches or exceeds the preselected efficiency goal.

4. The method of claim 3, wherein the one or more subsystems are selected from the group consisting of an engine, a transmission, and brakes.

5. The method of claim 1, wherein prompting the vehicle operator via a human-machine interface includes one of
audibly outputting the recommendation; and
displaying on the display a recommendation to change a vehicle parameter.

6. The method of claim 1, wherein the optimized route being optimized based on a list of preselected priorities that includes two or more of fuel efficiency, delivery time, and delivery risk.

7. The method of claim 1, wherein the one or more route characteristics are selected from a group consisting of speed limits, road signs, traffic signals, and road grades.

8. The method of claim 1, wherein the one or more sources of data further comprises one of traffic data and weather data.

9. In a vehicle having an engine, a transmission, and one or more computing devices configured to control one or more of the engine and transmission, the one or more computing devices configured to carry out a method for improving the efficiency of the vehicle, the method comprising:
calculating an optimized vehicle route based on a vehicle starting location and a vehicle ending location using data from one or more sources, the one or more sources of data indicative of one or more vehicle attributes and one or more GPS data types including route length or one or more route characteristics, wherein the vehicle route is optimized based on a list of preselected priorities;
generating an operational profile for the calculated route that represents at least one of engine operating parameters and transmission operating parameters as a function of time or distance, wherein the operational profile includes engine operating parameter values and transmission operating parameter values along the optimized vehicle route or segments thereof that will meet or exceed a preselected fuel efficiency goal; and during vehicle travel;
monitoring one or more of the GPS data types and vehicle parameter data including at least one selected from a group consisting of acceleration, speed, and gear selection; and
controlling the engine and transmission to operate the vehicle in a manner that matches or improves the operating parameters of the operational profile.

10. The method of claim 9, wherein the engine operating parameters or transmission operating parameters are selected from a group consisting of engine speed, engine acceleration, vehicle speed, vehicle acceleration, and transmission gear.

11. The method of claim 9, wherein the optimized route being optimized for two or more of fuel efficiency, delivery time, and delivery risk.

12. The method of claim 9, wherein the one or more route characteristics are selected from a group consisting of speed limits, road signs, traffic signals, and road grades.

13. A system for a vehicle, comprising:
one or more sensors for generating data indicative of vehicle attributes;
one or more sensors for generating data indicative of vehicle operating parameters;
a data acquisition unit that receives location data; and
one or more controlling components configured to:
obtain data indicative of one or more vehicle attributes;
obtain an optimized vehicle route based on a vehicle starting location, a vehicle ending location, and data from one more sources, the one or more sources of data indicative of one or more vehicle attributes and one or more GPS data types including route length and one or more route characteristics;
generate an operational profile that represents one or more vehicle operating parameters relating to one or more of engine speed, engine acceleration, vehicle speed, vehicle acceleration, transmission gear, and braking as a function of time or distance, wherein the operational profile includes vehicle operating parameter values of one or more of engine speed, engine acceleration, vehicle speed, vehicle acceleration, transmission gear, and braking over the optimized vehicle route or segments thereof that will meet or exceed a preselected fuel efficiency goal;
monitor one or more of the GPS data types and vehicle operating parameter data including at least one selected from a group consisting of acceleration, speed, gear selection, and braking;
prompt the vehicle operator for one or more vehicle parameter modifications based on the monitored GPS data types and vehicle operating parameter data.

14. The system of claim 13, wherein the one or more controlling components are further configured to control one or more subsystems of the vehicle in a manner that matches the vehicle operational profile.

15. The system of claim 14, wherein the one or more subsystems are selected from the group consisting of an engine, a transmission, and brakes.

16. The system of claim 13;
    wherein the one or more route characteristics are selected from a group consisting of speed limits, road signs, traffic signals, and road grades; and
    wherein the vehicle attributes are selected from a group consisting of current fuel level, vehicle weight, tire pressure, wind speed, ambient external temperature, vehicle type, engine type, transmission type data, and vehicle drag.

17. The method of claim 1, wherein the vehicle attributes include one or more of current fuel level data, vehicle weight data, tire pressure data, wind speed data, ambient external temperature data, vehicle type data, engine type data, transmission type data, vehicle drag data, and Brake Mean Effective Pressure (BMEP) data.

18. The method of claim 1, wherein said notifying the vehicle operator includes prompting the vehicle operator to operate the vehicle in a more efficient manner.

19. The method of claim 18, wherein said prompting the vehicle operator includes instructing the vehicle operator to change driver behavior including one of reducing speed, changing gears, reducing braking, and limiting acceleration.

20. The method of claim 1, wherein the vehicle operating profile includes one or more profile segments.

* * * * *